United States Patent [19]

Schwenninger et al.

[11] Patent Number: 4,780,122
[45] Date of Patent: Oct. 25, 1988

[54] VACUUM REFINING OF GLASS OR THE LIKE WITH ENHANCED FOAMING

[75] Inventors: Ronald L. Schwenninger, Ridgeley, W. Va.; Wright M. Welton, Oldtown; Boyd S. Dawson, Cumberland, both of Md.; Joseph M. Matesa, Plum Boro; Larry J. Shelestak, West Deer Township, Allegheny County, both of Pa.

[73] Assignee: PPG Industries, Inc., Pittsburgh, Pa.

[21] Appl. No.: 67,036

[22] Filed: Jun. 29, 1987

[51] Int. Cl.$^4$ .............................................. C03B 5/10
[52] U.S. Cl. ........................................ 65/135; 65/27; 65/126; 65/136; 65/325; 65/337; 65/346; 65/347
[58] Field of Search ................... 65/27, 126, 135, 136, 65/137, 325, 337, 346, 347

[56] References Cited

U.S. PATENT DOCUMENTS

| | | |
|---|---|---|
| 2,465,283 | 3/1949 | Schlehr. |
| 2,936,549 | 5/1960 | Stinnes et al. . |
| 3,429,684 | 2/1969 | Plumat .................................. 65/335 |
| 3,519,412 | 7/1970 | Olink ..................................... 65/337 |
| 4,195,982 | 4/1980 | Coucoulas et al. ................... 65/134 |

Primary Examiner—Arthur Kellogg
Attorney, Agent, or Firm—Dennis G. Millman

[57] ABSTRACT

Foaming of molten glass or the like as it enters a vacuum refining vessel is enhanced by altering the incoming stream so as to increase its surface area and/or retarding the passage of the stream through the vacuum headspace so as to increase its exposure to the vacuum.

20 Claims, 3 Drawing Sheets

VACUUM REFINING OF GLASS OR THE LIKE WITH ENHANCED FOAMING

BACKGROUND OF THE INVENTION

This invention relates to enhancing foam generation in an operation for refining molten glass under vacuum. In commonly assigned U.S. patent application Ser. No. 894,143 filed Aug. 7, 1986, there is disclosed a method and apparatus wherein the creation of foam in a vacuum refiner is encouraged by introducing molten glass into the upper headspace of the vacuum chamber. The molten glass immediately foams as it encounters the reduced pressure, and it has been found that foaming the glass is not a problem as had been thought previously, but is highly beneficial in removing dissolved and entrained gases from the melt. Moreover, it has been found advantageous to generate the foam above the liquid level in the refiner vessel, and preferably above the foam layer, so as to subject the foam to the lowest pressure in the vessel. The removal of gases from the liquid phase is greatly enhanced by the large surface area provided to the liquid in the bubble membranes of the foam. Thus, very thin liquid layers are subjected to low pressure in the foam within the vacuum chamber.

Under certain conditions, however, not all of the incoming molten glass stream foams immediately upon entering the vacuum space. In those cases, surface portions of the stream may foam quickly, but a central portion of the stream may penetrate unfoamed into the foam layer or even to the underlying molten pool. If the molten glass does not foam above the foam layer, it may not be exposed to the lowest pressure in the system and thus would be subjected to less than the optimum refining conditions, because even in the relatively light foam layer, pressures increase substantially at lower elevations. Any incoming glass that penetrates to the underlying liquid runs a considerable risk that it will not be exposed to sufficient vacuum to be refined and may be carried into the outgoing stream where it would degrade the quality of otherwise good product. Foaming of the incoming stream of glass may be improved by providing lower pressure in the vacuum chamber and/or reducing the glass flow rate, but it would be desirable to improve the degree to which the stream foams without altering such predetermined parameters as throughput and pressure.

Prior art proposals to refine glass by vacuum have generally avoided foaming the glass rather than enhancing it. Prior to the aforesaid co-pending application, molten glass was not injected into the upper headspace of a vacuum chamber. Therefore, there is no guidance in the prior art as to enhancing foam formation in such an operation.

SUMMARY OF THE INVENTION

The present invention has as its primary objective the enhancement of the degree to which molten glass is foamed as it enters a vacuum refining chamber. This is achieved by increasing the amount of time that the molten glass stream spends in the vacuum headspace, and/or reducing the thickness of the molten glass stream in the vacuum headspace at a given vacuum level and molten glass temperature. Conversely, the foam enhancement means of the present invention may permit maintaining a given degree of foaming with less vacuum or lower temperatures. Two approaches are taken in the present invention which need not be mutually exclusive: (1) the entering molten glass stream may be separated into a plurality of smaller streams or reshaped into a thinner stream, or (2) the passage of the molten glass stream through the vacuum headspace may be retarded.

In the first approach, the thickness of molten glass in the stream entering the vacuum headspace is reduced by subdividing or spreading the stream. Since foaming of the liquid stream progresses from the exterior surface toward the interior, reducing the thickness permits the entire thickness to foam in less time. Optimally, the time for complete foaming is reduced to less than the time required for the stream to fall to the level of the retained molten material in the vacuum chamber, preferably less than the time required to fall into the foam layer resting on the molten material. The particular thickness desired will be a function of glass temperature, vacuum pressure, and mass flow rate. The number of subdivisions of the stream will, in turn, depend upon the thickness requirement. Reducing the thickness of the stream is also advantageous even if it is completely foamed because gases from bursting foam bubbles may be more readily expelled from the foam when the bubbles are near the surface rather than within the interior portion of a relatively thick stream.

In the second approach, the incoming molten glass stream is obstructed temporarily from falling directly through the vacuum headspace. Thus, the molten glass stream is retained for a longer period of time in the region of lowest pressure, whereby more time is provided for the foaming to progress throughout the stream before it falls into the pool of molten material or the foam layer. The retardation is effected by providing an obstacle in the path of the stream within the vacuum headspace. This obstacle can achieve its purpose by creating a longer flow path for the molten glass, by creating a drag on the glass flow to decelerate it, or by providing a reservoir in the headspace to temporarily hold a volume of the incoming stream. In many cases, several or all of these effects can be achieved simultaneously, and in preferred embodiments subdividing and retarding the flow are both achieved.

The means for subdividing the stream of glass may comprise a plurality of inlets to the vacuum refining chamber, but because the inlets generally involve costly refractory metal construction, valving means, and sealing arrangements, it is preferred to employ a single inlet and to subdivide the stream within the vacuum chamber. Therefore, the apparatus for subdividing or retarding the stream of molten glass may be suspended within the upper portion of the vacuum chamber in the path of the molten glass discharging from the inlet orifice. It is preferred to mount the foam enhancing device as high as possible so as to maximize the time that the falling foam is exposed to the low pressure in the vacuum headspace. The device is preferably fabricated of a non-contaminating refractory material such as platinum and may be in the form of a plate, bowl, screen, or basket, as examples. Perforations to subdivide the stream are preferably present in the device. Two or more foam enhancing devices may be provided one below the other to act on the glass stream in sequence.

These and other aspects of the invention will become more apparent from the drawings and the detailed description of the preferred embodiments which follows.

DETAILED DESCRIPTION

The present invention is described herein as relating to the making of glass. It should be understood that the term glass is intended to be used in its broadest sense to include materials that are "glassy" or "glass-like" since the final state of vitrification is not a critical factor in the present invention. On the other hand, the most likely application for the present invention is in the making of transparent glass products of high quality to which the elimination of bubbles and seeds from the glass is important. Moreover, the advantages of the present invention are particularly relevant to the continuous, large scale (e.g., greater than 10 tons per day, 9 metric tons per day), commercial production of glass, especially glass for vision glazing.

In the preferred embodiment, an apparatus is provided by which vacuum refining may be employed in a commercial scale, continuous glassmaking process. Molten glass is admitted to the vacuum refining chamber after the majority of the thermal energy required for melting has been imparted to the melt so that little or no thermal energy need be supplied to the molten material contained within the vacuum chamber. Preferably, no more heat is added at the vacuum stage than is necessary to compensate for heat loss through the vessel walls. At sufficiently high throughput rates, the vacuum chamber may be completely unheated by other than the incoming molten glass itself. In preferred embodiments of the present invention, batch materials are first liquefied at a stage specifically adapted for that step of the process, and the liquefied material is transferred to a second stage where dissolution of solid particles is essentially completed and the temperature of the material may be raised to a temperature to provide a viscosity suitable for refining. Subsequently, the molten material is passed to the vacuum chamber. As a result, a large portion of the gaseous by-products of melting are driven off before the material is subjected to vacuum, and the region of greatest gas evolution is separated from the refining zone, whereby materials undergoing the early stages of melting cannot become mixed with portions of the melt undergoing refining. Because most or all of the thermal requirement for melting has been satisfied before the material enters the vacuum refining stage and heating of the refining stage can therefore be substantially avoided, excessive convection of the melt in the refining zone can be avoided. As a result, vessel erosion is reduced and the probability of incompletely refined portions of the melt becoming mixed with more refined portions is reduced.

The assistance provided by the vacuum to the refining process enables lower temperatures to be used for refining. Lower temperatures are advantageous not only for less energy consumption, but also for the sake of reduced corrosive effect on the vessel. Glass normally refined at peak temperatures on the order of 2800° F. (1520° C.) can be refined to the same extent at temperatures no greater than about 2600° F. (1425° C.) or even 2500° F. (1370° C.) or lower, depending upon the level of vacuum employed.

It is theorized that the creation of foam in the vacuum refining chamber significantly enhances removal of gases from the melt. The thin film and large surface area presented by the foam increases exposure to the low pressure conditions and expedites transport of the gases out of the liquid phase. This contrasts to conventional refining where residence time must be provided to permit bubbles to rise to the surface and escape from the viscous melt, which entails retaining a large pool of the melt. Thus, vacuum refining can achieve a given degree of refining in a considerably smaller space. The beneficial effects of exposing foamed melt to vacuum are enhanced by foaming the material as it enters the vacuum vessel, before it enters the body of molten material retained therein, and preferably before the entering stream penetrates into the foam layer.

The preferred configuration for the vacuum refining chamber is a vertically elongated vessel, most conveniently in the shape of an upright cylinder. Liquified material is introduced into the headspace above the molten material held in the vessel. Upon encountering the reduced pressure in the headspace, at least a substantial portion of the material foams due to evolvement of gases dissolved in the material and due to enlargement of bubbles and seeds present in the material. Creating a foam greatly increases the surface area exposed to the reduced pressure, thus aiding the removal of gaseous species from the liquid phase. Producing the foam above the molten pool held in the vessel rather than from the molten pool is advantageous for collapsing foam and aiding the escape of gases. Another advantage of the vertically elongated geometry is that stratification occurs due to the less dense foam or bubble containing material remaining at the upper end, so that the overall mass transport is away from the foam region, thereby rendering it unlikely that any of the unrefined material would become included in the product stream. Stripping gases from the melt at reduced pressure reduces the concentration of gases dissolved in the melt to below their saturation points at atmospheric pressure. As the molten material progresses downwardly toward an outlet at the bottom, the increasing pressure due to the depth of the melt in the vessel induces any residual gases to remain in solution and decreases the volume of any small seeds that may remain. Dissolution of gases may also be aided by permitting the temperature to fall as the material progresses toward the outlet. Moreover, the low concentration of gases remaining after vacuum refining reduces the probability of nucleation of bubbles in subsequent stages of the glassmaking process, as is frequently a problem with conventional refining.

In commercial melting of glass, especially soda-lime-silica glass, sodium sulfate or calcium sulfate or other sources of sulfur are usually included in the batch materials to aid the melting and refining process. The presence of refining aids such as sulfur in the melt has been found to be a problem when refining with vacuum because of the large volumes of foam induced and because of attack on the ceramic refractory walls of a vacuum refining vessel. But heretofore, effective melting and refining of glass have been difficult to achieve without the refining aids. In accordance with preferred embodiments of the present invention, glass is melted and refined to a high standard of quality with the use of little or no chemical refining aid. This is feasible in the present invention because the melting and refining steps are carried out in discrete stages, whereby each stage may be carried out by a process adapted to minimize or avoid the use of chemical refining aids. It is generally believed that chemical refining aids serve to expedite the accumulation and rise of bubbles from within a molten pool, but such a mechanism is believed to play no more than a minor role in the refining process of the present invention. Therefore, no significant effect on quality results from eliminating or substantially reducing the amount of refining aids used. Elimination or reduction of the refining aids is also desirable for the sake of reducing undesirable emissions into the environment. In the float process of manufacturing flat glass, reducing or eliminating sulfur from the glass is additionally advantageous for the sake of avoiding defects caused by the formation and volatilization of tin sulfide in the flat forming chamber that leads to condensation and drippage onto the top surface of the glass. Sulfur in combination with iron has a coloration effect on glass, so the avoidance of sulfur for refining permits more precise control of the color of some glass.

Figures 1, 2, 3:
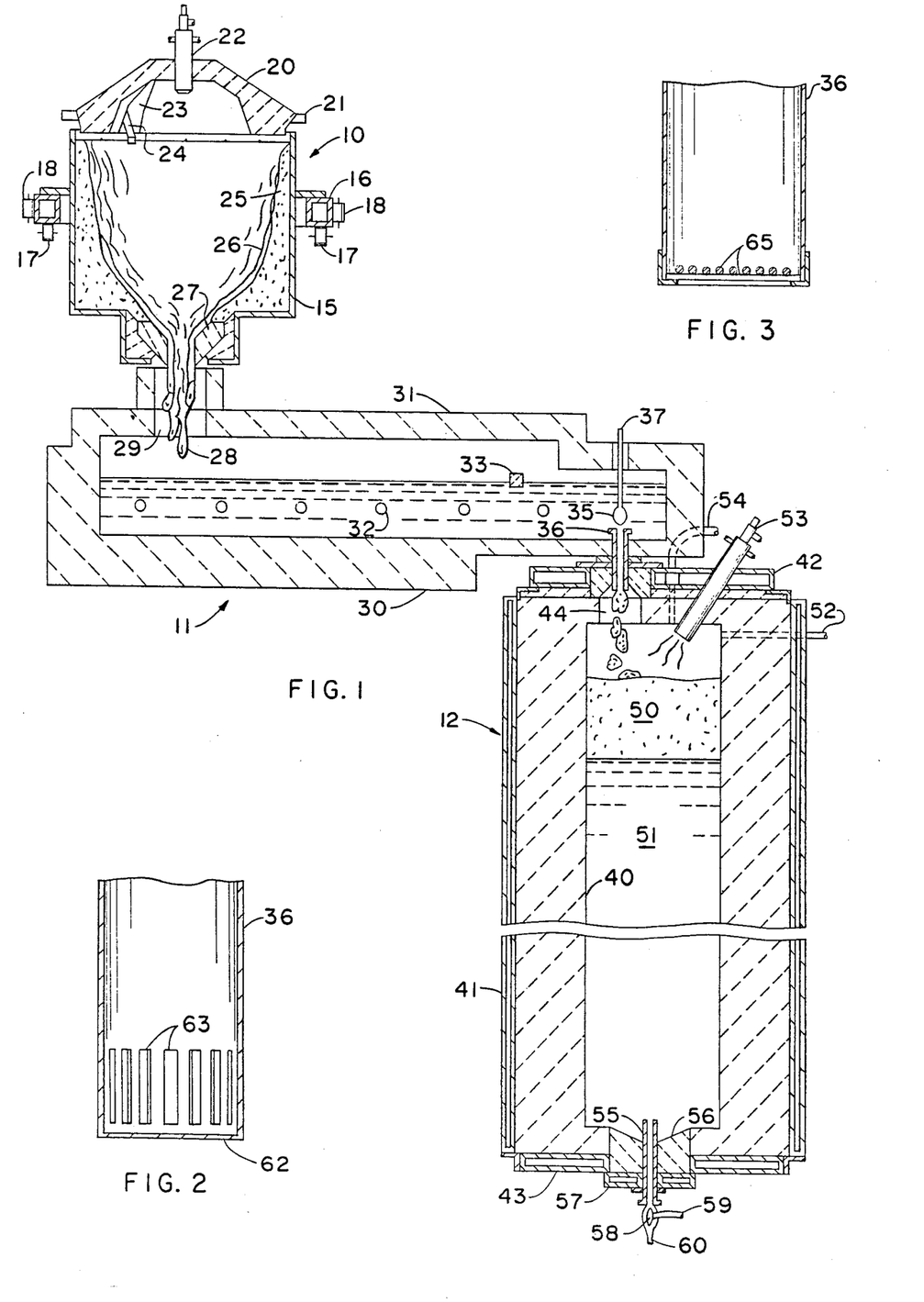
FIG. 1 is a vertical cross-section through a glass melting and refining system including a vacuum refining vessel to which the present invention is an improvement.
FIG. 2 is an enlarged, cross-sectional view of a tube for delivering molten glass to a vacuum refining chamber, provided with slotted orifices in accordance with one embodiment of the invention.
FIG. 3 is a cross-sectional view of another inlet tube embodiment having a mesh in the flow path.

Referring to FIG. 1, the overall melting process of the present invention preferably consists of three stages: a liquefaction stage 10, a dissolving stage 11 and a vacuum refining stage 12. Various arrangements could be employed to initiate the melting in the liquefaction stage 10, but a highly effective arrangement for isolating this stage of the process and carrying it out economically is that disclosed in U.S. Pat. Nos. 4,381,934 and Re. 32,317 which are hereby incorporated by reference for details of the preferred liquefaction stage embodiment. The basic structure of the liquefaction vessel is a drum 15 which may be fabricated of steel and has a generally cylindrical sidewall portion, a generally open top, and a bottom portion that is closed except for a drain outlet. The drum 15 is mounted for rotation about a substantially vertical axis, for example, by means of an encircling support ring 16 rotatably carried on a plurality of support wheels 17 and held in place by a plurality of aligning wheels 18. A substantially enclosed cavity is formed within the drum 15 by means of a lid structure 20 which is provided with stationary support by way of a peripheral frame 21, for example. The lid 20 may take a variety of forms as may be known to those of skill in the art of refractory furnace construction. The preferred arrangement depicted in the figure is an upwardly domed, sprung arch construction fabricated from a plurality of refractory blocks. It should be understood that monolithic or flat suspended designs could be employed for the lid.

Heat for liquefying the batch material may be provided by one or more burners 22 extending through the lid 20. Preferably, a plurality of burners are arranged around the perimeter of the lid so as to direct their flames toward a wide area of the material within the drum. The burners are preferably water cooled to protect them from the harsh environment within the vessel. Exhaust gases may escape from the interior of the liquefaction vessel through an opening 23 in the lid. Advantageously the waste heat in the exhaust gases may be used to preheat the batch material in a preheating stage (not shown) such as that disclosed in U.S. Pat. No. 4,519,814.

Batch materials, preferably in a pulverulent state, may be fed into the cavity of the liquefying vessel by means of a chute 24, which in the embodiment depicted extends through the exhaust opening 23. Details of the feed chute arrangement may be seen in U.S. Pat. No. 4,529,428. The batch chute 24 terminates closely adjacent to the sidewalls of the drum 10, whereby batch material is deposited onto the inner sidewall portions of the drum. A layer 25 of he batch material is retained on the interior walls of the drum 10 aided by the rotation of the drum and serves as an insulating lining. As batch material on the surface of the lining 25 is exposed to the heat within the cavity, it forms a liquefied layer 26 that flows down the sloped lining to a central drain opening at the bottom of the vessel. The outlet may be fitted with a ceramic refractory bushing 27. A stream of liquefied material 28 falls freely from the liquefaction vessel through an opening 29 leading to the second stage 11. The second stage may be termed the dissolving vessel because one of its functions is to complete the dissolution of any unmelted grains of batch material remaining in the liquefied stream 28 leaving the liquefaction vessel 10. The liquefied material at that point is typically only partially melted, including unmelted sand grains and a substantial gaseous phase. In a typical soda-lime-silica melting process using carbonate batch materials and sulfates as a refining aid, the gaseous phase is chiefly comprised of carbon oxides and sulfur oxides. Nitrogen may also be present from entrapped air. In the present invention, the need to use sulfates is greatly reduced, so that sulfur oxides may not be present to a significant extent as part of the gas content of the melt.

The dissolving vessel 11 serves the function of completing the dissolution of unmelted particles in the liquefied material coming from the first stage by providing residence time at a location isolated from the downstream refining stage. Soda-lime-silica glass batch typically liquefies at a temperature of about 2200° F. (1200° C.) and enters the dissolving vessel 11 at a temperature of about 2200° F. (1200° C.) to about 2400° F. (1320° C.), at which temperature residual unmelted particles usually become dissolved when provided with sufficient residence time. The dissolving vessel 11 shown is in the form of a horizontally elongated refractory basin 30 with a refractory roof 31, with the inlet and outlet at opposite ends thereof so as to assure adequate residence time. The depth of molten material in the dissolving vessel may be relatively shallow in order to discourage recirculating of material.

Although the addition of substantial thermal energy is not necessary to perform the dissolving step, heating can expedite the process and thus reduce the size of the dissolving vessel 11. More significantly, however, it is preferred to heat the material in the dissolving stage so as to raise its temperature in preparation for the refining stage to follow. Maximizing the temperature for refining is advantageous for the sake of reducing glass viscosity and increasing vapor pressure of included gases. Typically a temperature of about 2800° F. (1520° C.) is considered desirable for refining soda-lime-silica glass, but when vacuum is employed to assist refining, lower peak refining temperatures may be used without sacrificing product quality. The amount by which temperatures can be reduced depends upon the degree of vacuum. Therefore, when refining is to be performed under vacuum in accordance with the present invention, the glass temperature need be raised to no more than 2700° F. (1480° C.), for example, and optionally no more than 2600° F. (1430° C.) prior to refining. When the lower range of pressures disclosed herein are used, the temperature in the refining vessel need be no higher than 2500° F. (1370° C.). Peak temperature reductions on this order result in significantly longer life for refractory vessels as well as energy savings. The liquefied material entering the dissolving vessel need be heated only moderately to prepare the molten material for refining. Combustion heat sources could be used in the dissolving stage 11, but it has been found that this stage lends itself well to electric heating, whereby a plurality of electrodes 32 may be provided as shown in the figure extending horizontally through the sidewalls. Heat is generated by the resistance of the melt itself to electric current passing between electrodes in the technique conventionally employed to electrically melt glass. The elecrodes 32 may be carbon or molybdenum of a type well known to those of skill in the art. A skimming member 33 may be provided in the dissolving vessel to prevent any floating material from approaching the outlet end.

A valve controlling the flow of material from the dissolving stage 11 to the refining stage 12 is comprised of a plunger 35 axially aligned with a drain tube 36. The shaft 37 of the plunger extends through the roof 31 of the dissolving vessel so as to permit control over the gap of the plunger 35 and the tube 36 to thereby modulate the rate of flow of material into the refining stage. Although the valve arrangement is preferred, other means could be provided to control the flow rate of molten material to the refining stage as are known in the art. An example would be the use of heating and/or cooling means associated with the drain tube so as to modulate the viscosity, and thus the flow rate, of the molten material passing therethrough.

The refining stage 12 preferably consists of a vertically upright vessel that may be generally cylindrical in configuration having an interior ceramic refractory lining 40 shrouded in a gas-tight water-cooled casing. The refractory may be an alumina-zirconia-silica type well known in the art. The casing may include a double walled, cylindrical sidewall member 41 having an annular water passageway therebetween and circular end coolers 42 and 43. A layer of insulation (not shown) may be provided between the refractory 40 and the sidewall 41. The valve tube 36 may be fabricated of a refractory metal such as platinum and is sealingly fitted into an orifice 44 at the upper end of the refining vessel. The tube 36 is shown extending vertically through the top of the refining vessel 12, which is preferred for the sake of introducing the incoming stream of glass as high as possible within the vacuum space. But it should be understood that the present invention would also be applicable to inlet arrangements that do not maximize the height factor. Thus, the inlet could be horizontal and could extend through the side of the vessel, but would be above the level of molten material and preferably above the normal level of foam in the vessel 12.

As the molten material passes through the tube 36 and encounters the reduced pressure within the refining vessel, gases dissolved and occluded in the melt expand in volume, creating a foam layer 50 resting on a body of liquid 51. As foam collapses it is incorporated into the liquid body 51. Subatmospheric pressure may be established within the refining vessel through a vacuum conduit 52 extending through the upper portion of the vessel. As used herein, "foaming" can be considered to be characterized by at least a doubling of the volume of the molten material. If the material is fully foamed, the volume increase is usually much greater than double. Foam has also been defined as being characterized by a gas phase of at least 90 percent of the total volume, or as the condition in which bubble membranes touch each other.

Distributing the molten material as thin membranes of a foam greatly increases the surface area exposed to the reduced pressure. Therefore, maximizing the foaming effect is preferred. It is also preferred that the foam be exposed to the lowest pressures in the system, which are encountered at the top of the vessel in the headspace above the liquid, and therefore exposure is improved by permitting newly introduced, foamed material to fall through the headspace onto the top of the foam layer. Also, it is more consistent with the mass transfer in the vessel to deposit freshly foamed material onto the top of the foam layer rather than generating foam from the surface of the liquid pool beneath the foam layer.

The heat content of the molten throughput material entering the refining vessel 12 can be sufficient to maintain suitable temperatures within the vessel, but at lower throughput rates energy losses through the walls may exceed the rate at which energy is being transported into the vessel by the molten material. In such a case, it may be desirable to provide heating within the refining vessel for the sake of avoiding undue temperature reduction. The amount of heating could be relatively minor since its purpose would be merely to offset heat losses through the walls, and may be carried out by conventional electric heating arrangements whereby electrodes extend radially through the side wall and electric current is passed between the electrodes through the glass.

Regardless of the throughput rate, the space above the molten body 51 in the vessel 12 can tend to be cooler than desired because of the absence of the molten mass and because radiation from the molten mass is insulated by the foam layer 50. As a result, the upper portion of the foam layer can become cooler, which in turn increases the viscosity of the foam and slows the rate at which gases are expelled. In that case, it has been found advantageous to provide means for heating the headspace above the liquid and foam. For this purpose, it has been found feasible to provide a burner 53 and to sustain combustion within the vacuum space. A conduit 54 may be provided at the upper end of the vacuum vessel whereby a small amount of water may be sprayed onto the foam periodically. The water spray has been found to assist the foam to collapse.

In the embodiment depicted, refined molten material is drained from the bottom of the refining vessel 12 by way of a drain tube 55 of a refractory metal such as platinum. It would also be feasible to locate the drain in a side wall of the vessel in the region of the bottom. The drain tube 55 preferably extends above the surface of the refractory bottom section 56 within which it is mounted to prevent any debris from entering the output stream. Leakage around the tube is prevented by a water cooler 57 under the bottom section 56. The flow rate of molten material from the drain tube 55 may be controlled by a conical throttle member 58 whereby adjusting the gap between the throttle member and the tube 55 controls the flow rate therefrom. A molten stream 60 of refined material falls freely from the bottom of the refining vessel and may be passed to a forming station (not shown) where it may be shaped to the desired product. Refined glass, for example, may be passed to a float glass forming chamber where the molten glass floats on a pool of molten metal to form a flat sheet of glass.

Melting and fining aids such as sulfur compounds (e.g., sodium sulfate, calcium sulfate) are conventionally included in glass batches, but produce a substantial portion of the undesirable emissions in exhaust gas from glass melting operations. Sulfur compounds are responsible for a significant portion of the gas phase found in mol glass products, and thus their removal is an important part of a refining process. In a vacuum refining process, the presence of amounts of sulfur that would conventionally be considered very small are more than desired because of the large contribution sulfur compounds make to the atmosphere in the vacuum chamber and because of the accelerated erosion of the vacuum chamber walls caused by the present of sulfur. Typically, flat glass batch includes sodium sulfate in the amounts of about 5 to 15 parts by weight per 1000 parts by weight of the silica source material (sand), with about 10 parts by weight considered desirable to assure adequate refining. When operating in accordance with the present invention, however, it has been found preferable to restrict the sodium sulfate to two parts by weight, most preferably, no more than one part per 1000 parts sand, with one-half part being a particularly advantageous example. These weight ratios have been given for sodium sulfate, but it should be apparent that they can be converted to other sulfur sources by molecular weight ratios. Complete elimination of refining aids is feasible with the present invention, although trace amounts of sulfur are typically present in other batch materials so that small amounts of sulfur may be present even if no deliberate inclusion of sulfur is made in the batch.

The attainment of complete foaming is easier at lower pressures, and therefore lower pressures in the refining vessel are preferred. The foam enhancement devices of the present invention permit the use of higher pressures than would otherwise be possible, thus saving on vacuum pump costs. But even when using these devices, exceeding certain pressure levels can make it very difficult to achieve complete foaming. These maximum pressure levels depend upon the viscosity of the glass stream entering the vacuum chamber, which, in turn, depends upon the temperature and composition of the glass. For a conventional soda-lime-silica flat glass composition at 2500° F. (1370° C.) to 2700° F. (1480° C.) it has been found to be desirable to provide pressure below 100 torr absolute, preferably below 70 torr, in the headspace of the refining vessel 12 to achieve complete foaming. How much lower than these maximum pressures the pressure in the vacuum space should be maintained depends upon the mass flow rate of glass and the particular foam enhancement device used. At relatively high glass flow rates pressures below 40 torr may be preferred even with extensive foam enhancement devices. But at about 20 torr, only modest foam enhancement devices may be required even at high flow rates.

In FIGS. 2 through 12 there are illustrated several embodiments of flow enhancement devices in accordance with the present invention. Each of these devices is intended to be mounted within the vacuum refining vessel 12 shown in FIG. 1, in association with the lower end of tube 36 so as to be impinged by the stream of molten material passing from the tube 36. The foam enhancement device may be affixed to or be integral with the tube 36 itself, or it may be independently mounted to the adjacent lid structure of the vessel 12 or on a support arm extending into the vacuum vessel through an access opening in a wall portion. The latter is preferred for the sake of adjusting the position and orientation of the device as well as permitting relatively easy replacement. The elevation of the device is above the molten body 51, preferably above the foam layer 50.

Except where noted, the device of each embodiment is preferably fabricated from platinum, and in particular the platinum/rhodium alloys commonly used for molten glass contact applications. Theoretically, any refractory material could serve the purpose of the present invention, but durability problems render most other materials impractical. Ceramic refractories would be subject to considerable erosion due to contact with the flowing stream. The atmosphere in the headspace of the vessel 12 has been found to be sufficiently oxidizing to deterimentally affect the durability of molybdenum. Water-cooled stainless steel or the like can be used, but it is preferred to minimize extraction of heat from the glass by cooled members. Some water-cooled elements may be employed in some of the embodiments without undue heat loss, provided that they are limited in their area of exposure.

In its simplest form, the foam enhancement devices of the present invention may involve modifications to the outlet end of the tube 36. Thus, in the embodiment of FIG. 2, the tube 36 is provided with a closed lower end 62 and a plurality of side orifices 63, whereby the stream of molten material passing through the tube is divided into a plurality of smaller streams, each of which is more readily acted upon by the low pressure environment. The orifices 63 are shown as rectangular slots, but could be any shape. The size of the orifices is chosen in accordance with the number of stream subdivisions desired and the amount of flow resistance that can be tolerated. The end member 62 may also be provided with one or more orifices, and if provided with a plurality of orifices, may serve as the stream dividing means instead of side orifices.

Along these lines, FIG. 3 depicts an embodiment that includes an insert in the end of the tube 36 for subdividing the molten glass stream. The insert may take the form of a grid of rods or wires 65, as shown, or a wire mesh, perforated plate, or other foraminous member. Close spacing of the subdivided stream portions may cause the stream portions to recombine subsequently, but that is not detrimental if the stream portions have been acted upon by the vacuum before they recombine. Depending upon the mass flow rate and the vacuum level, the foaming of the stream portions may occur almost immediately upon encountering the reduced pressure and before recombining. At higher throughput rates, however, it may be preferred to use some of the other embodiments disclosed herein that provide a subdivided or thinned stream for more extended periods of time.

Figure 4:
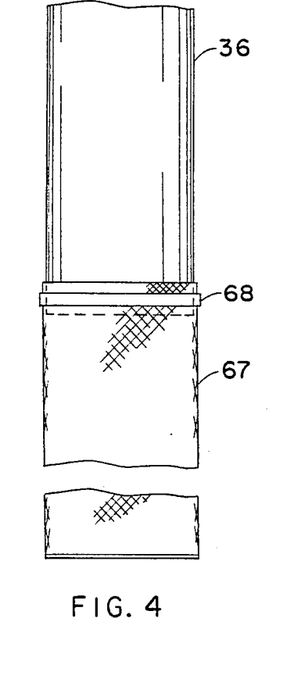
FIG. 4 is a side elevational view of an alternative inlet tube embodiment having a foraminous receptacle in the flow path.

The embodiments of FIGS. 2 and 3 are not the preferred embodiments, particularly at high flow rates, because of the added resistance to flow through the tube 36. This resistance not only reduces flow through the tube, but also complicates regulating the flow rate by valve means 35 or the like. Therefore, it is preferred to permit the molten material to be discharged from the tube 36 and then to be engaged by a foam enhancing device of the present invention a sufficient distance from the tube to avoid imparting a significant back-pressure within the tube. Accordingly, a wire mesh or the like is employed in the embodiment of FIG. 4 in the form of a basket-like receptacle 67. Instead of a mesh, the receptacle 67 could be fabricated from perforated sheet material or other foraminous material. The openings in the receptacle subdivide the incoming molten stream at least momentarily, and the receptacle provides resistance to prevent the stream from falling immediately into the foam layer or below. The receptacle 67 is shown generally cylindrical in configuration, but it should be apparent that it could be provided with virtually any shape that would retard the velocity of the stream. Some advantage is provided by enclosing the outlet end of the tube 36 with the receptacle 67 in that no portion of the stream can escape being acted on by the receptacle. The upper end of the receptacle 67 may be affixed around the tube 36 by means of a compression band 68 as shown in FIG. 4. The receptacle 67 may be somewhat elongated to provide sufficient interior volume to accommodate any build-up of foam or molten material therein so as not to affect flow from the tube 36.

Figure 5:
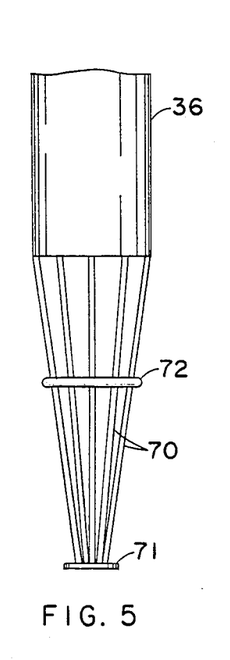
FIG. 5 is a side elevational view of an inlet tube fitted with a cage-like structure below its outlet.

A variation of the basket type foam enhancer of the present invention is shown in FIG. 5. There, an enclosure resembling a cage is fabricated from a plurality of rods 70. The cage could be provided with a wide variety of shapes, but some advantage may be found for the conical configuration shown in FIG. 5 in that it presents openings of varying width, with wide openings at the top for passing foamy material and narrow openings at the bottom for restricting the size of subdivided liquid streams passing through. Additionally, the conical shape presents little obstruction to the passage of the stream and thus is not prone to create a back-pressure in the tube 36. As illustrated, the rods 70 may be joined at their bottom ends on a disk 71 and their upper ends may be affixed to the tube 36 such as by welding. Optionally, the rods may be reinforced by one or more circumferential rings 72 at an intermediate elevation or elevations.

Figure 6:
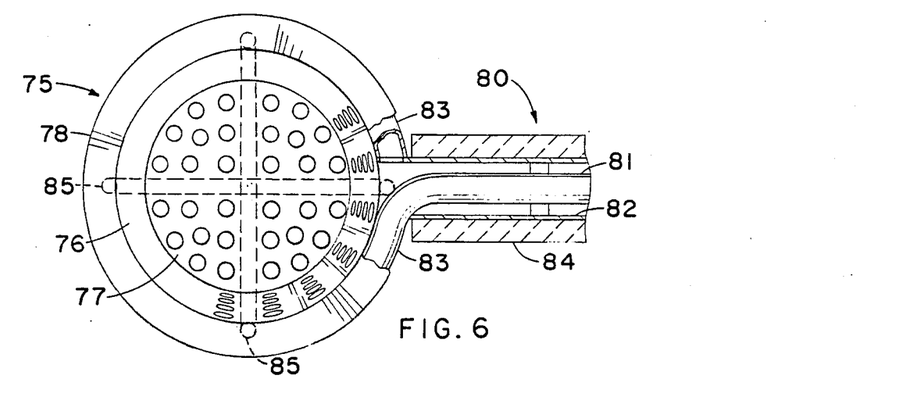
FIG. 6 is a top view, partially broken away of a perforated cup adapted to engage a stream of molten glass entering a vacuum refining chamber.
Figure 7:
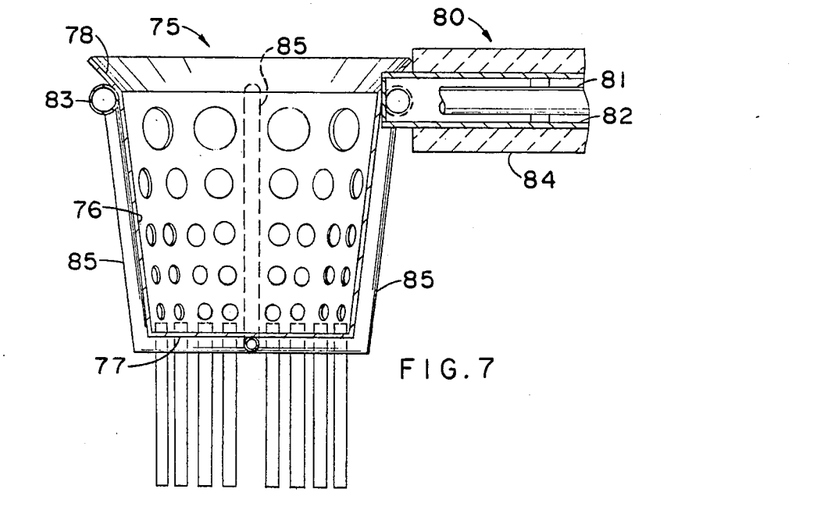
FIG. 7 is a cross-sectional side view of the device of FIG. 6.

In FIGS. 6 and 7 there is shown another embodiment of the present invention wherein the foam enhancing receptacle is in the form of a perforated cup 75. The cup 75 may be formed of a side wall portion 76, bottom 77, and optionally a flared rim portion 78, all of which are preferably fabricated of platinum alloy. The side wall and bottom of the cup are provided with a plurality of holes through which the molten material may pass. The number and size of the holes may vary considerably, depending upon the effect desired in a particular case. Holes in the range of 0.5 to 3 centimeters in diameter have been found to be satisfactory in typical cases, with the number of holes being maximized without unduly reducing the structural strength of the cup. Although holes of a uniform size may be used, it is preferred to provide larger holes near the top so that at high flow rates any surplus flow will pass through the large holes rather than over the rim of the cup. The cup embodiment of FIGS. 6 and 7 could be suspended from the tube 36 as in the embodiments described heretofore, but a different support arrangement is shown wherein the flow enhancement device is mounted on a support arm 80 independent from the tube 36 and preferably extending to the exterior of the vacuum refining vessel 12 so as to permit adjustment or replacement of the device. In order to provide structural rigidity along a substantial horizontal distance in the high temperature environment of the refining vessel, it is preferred that the support arm 80 be cooled by circulation of cooling fluid such as water therethrough. To this end, the arm 80 shown in FIGS. 6 and 7 includes concentric coolant conduits 81 and 82. In order to provide rigid support of the cup 75 itself, the illustrated embodiment includes a conduit loop 83 through which the coolant is circulated and within which the cup 75 rests. As shown, the loop 83 comprises an extension of the inner arm coolant conduit 81 and terminates with a connection to the outer arm coolant conduit 82. Accordingly, coolant may circulate from conduit 81 through the loop 83 and out through conduit 82. The direction of flow may, of course, be reversed. Because of the cooling, the conduits 81 and 82 and the loop 83 need not be fabricated of platinum, but may be made of stainless steel or the like. In order to reduce the cooling effect of the cooled support arm 80 on the interior of the refining vessel, the arm may be provided with an insulating cover such as the refractory tube 84 shown in FIGS. 6 and 7. Additional structural strength may be provided to the cup 75 by reinforcement members 85 which may comprise platinum alloy tubes welded to the loop 83 and extending down the side and under the cup. It should be understood that the shape of the cup may vary considerably from the frusto-conical embodiment shown in FIGS. 6 and 7. In particular, horizontally oblong cups may be advantageous for the sake of increasing the volume of the cup of while permitting passage into the vessel through an access opening of limited size. The arm 80 may extend substantially horizontally through an opening in the side of the vessel, or it may include a bend so as to extend vertically through the top of the vessel. A swivel connection may be provided at the location where the arm passes through the vessel wall to provide a gas-tight seal while permitting adjustments to the position of the foam enhancing device.

Figure 8:
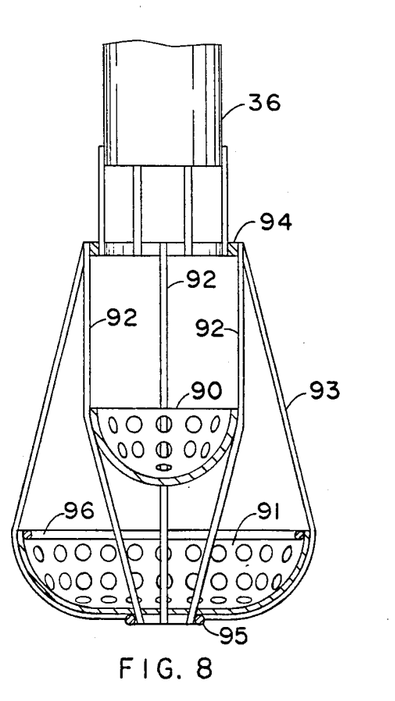
FIG. 8 is a cross-sectional view of a two staged foam enhancement device in accordance with a preferred embodiment of the invention, affixed to an inlet tube.

In any of the embodiments of the invention, heavy flow rates can cause the capacity of the foam enhancement device to be exceeded. In such cases it may be desirable to provide a two stage foam enhancement device. In other words, if the stream is not foamed to the extent desired after passing a first foam enhancement device, it may be passed to one or more additional foam enhancement devices positioned to receive the partially foamed stream from the first device. The secondary devices may be substantially the same design as the first device, or combinations of different designs may be employed. Generally, each secondary or subsequent stage would preferably be larger than the preceding stage. An example of a two stage device is shown in FIG. 8 where a first apertured bowl 90 is supported above a second apertured bowl 91, both being mounted in vertical alignment with the outlet of tube 36 so as to receive the incoming stream of molten material. Material that may overflow bowl 90 or otherwise be insufficiently treated by bowl 90 is received by bowl 91 where the flow is again retarded, subdivided, and reduced in thickness. Two stages appear to be adequate for most purposes, but three or more stages may be resorted to if necessary to achieve a desired degree of foaming under particular conditions. The structure for supporting bowls 90 and 91 illustrated in FIG. 8 is merely a preferred example. It should be apparent that many variations of such a structure are possible. A plurality of tubes 92 support the upper bowl 90 and another group of tubes 93 supports the lower bowl 91. Both sets of tubes may extend upwardly to an attachment to a ring 94, which in turn may be supported from the tube 36 as shown, or from a laterally extending arm as in FIGS. 6 and 7. In the particular arrangement shown in FIG. 8, the tubes 92 angle inwardly below the bowl 90 in order to provide additional support to bowl 90 and extend through the lower bowl 91 to join with tubes 93 in attachment to a bottom support ring 95, thereby providing additional rigidity to the structure. The rim of bowl 91 is reinforced with a tube 96 as an optional feature.

Figure 9:
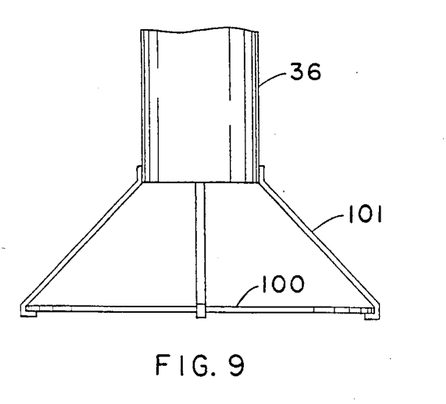
FIG. 9 is a side elevational view of a tray configuration of foam enhancement device associated with an inlet tube in accordance with another embodiment of the present invention.

Subdividing the stream in order to reduce its thickness and thus expose all portions of the stream to the effects of the vacuum is a feature of each of the embodiments discussed hereinabove. Instead of subdividing, it is also possible to reduce the stream thickness by spreading. This approach is shown in the embodiments of FIGS. 9 through 12. A falling stream of liquid attains a cylindrical shape under the influence of surface tension because that shape has the least surface area. Unfortunately, that shape is the least desirable for the sake of vacuum foaming the stream. Any modification to the shape of the stream will advantageously increase the surface area per unit volume of the stream. Therefore, one approach to reducing the stream thickness to enhance foaming is to provide a non-cylindrical stream shape, such as by using a non-circular inlet opening (e.g., a slot). A solid body placed in the path of the stream that alters its shape is also a beneficial approach and has the additional advantage of reducing the velocity of the stream, whereby its residence time in the headspace is greater. Therefore, the preferred stream modifying shapes are those that also provide substantial retardation. Maximum retardation can be achieved with horizontal surfaces, and a simple embodiment of that type is shown in FIG. 9.

FIG. 9 shows a solid tray 100 that may, for example, be generally circular in shape, supported horizontally below tube 36 by a plurality of brackets 101. Alternatively, the tray could be carried by a laterally extending support arm. Molten material flowing from the tube 36 spreads on the tray 100, is reduced in thickness as it is momentarily detained on the tray, and flows over the edges of the tray in a generally annular shape having considerably greater surface area than the original stream. The tray may be provided with upwardly projecting edge portions if it is desired to retain a larger amount of material on the tray. The edge portions may also be notched to produce subdivided streams flowing from the tray.

Figure 10:
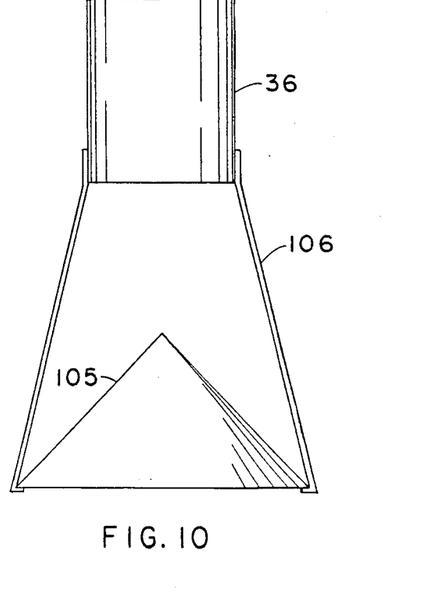
FIG. 10 is a side elevational view of a conical variation of a device similar to that shown in FIG. 9.

A variation of the FIG. 9 embodiment is shown in FIG. 10 where the flow spreading device is not horizontal but has substantial horizontal dimensions. Instead of a tray, an upwardly pointed conical member 105 is provided, supported by brackets 106 from tube 36. It should be apparent that various other shapes could be used to spread the stream, such as a hemisphere, wedge, or tetrahedron.

Figure 11:
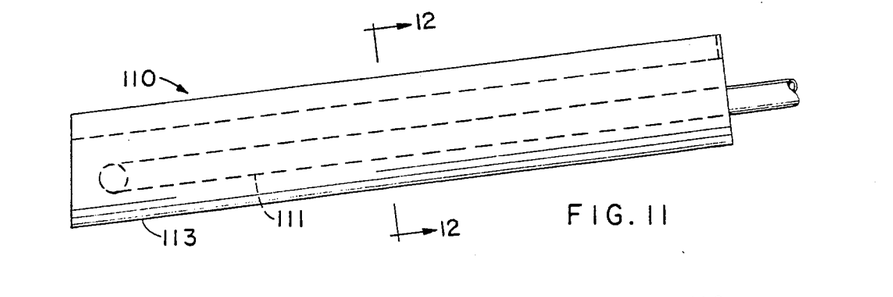
FIG. 11 is a side elevational view of a foam enhancement device configured as a trough in accordance with an embodiment of the invention.
Figure 12:
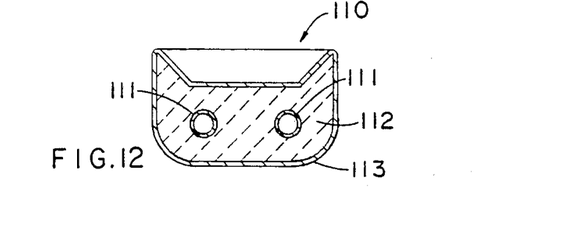
FIG. 12 is a transverse cross-sectional view of the trough embodiment of FIG. 11, taken along line 12—12.

In the embodiment depicted in FIGS. 11 and 12, some spreading of the stream may occur, but the primary effect is to lengthen the flow path so as to increase the time that the melt is exposed to the low pressure in the headspace. This embodiment entails means to divert the falling stream from its vertical path to a more tortuous path. An example of a relatively simple flow diverting means is a trough 110 as shown in FIGS. 11 and 12. The trough may be supported within the headspace of the refining vessel 12 at a slight angle from horizontal, and the incoming stream may impinge on the high end of the trough and flow off the low end. In order to provide stiffness to the horizontally elongated trough the use of cooling means is preferred. Therefore, a conduit 111 for circulation of coolant (preferably water) may be provided in the trough with a hair pin configuration for example. The coolant conduit also may serve as the support arm for the trough. The conduit 111 may be fabricated from stainless steel or the like. To reduce heat loss from refiner to the cooling conduit 111, the conduit may be encased in refractory material 112. The refractory 112 is preferably sheathed in a platinum alloy cover 113 to provide durability to flowing molten glass. As shown in FIG. 12, the upper surface of the trough may be concavely contoured to help guide the flow along its length. Although the primary intended flow path is along the length of the trough, at high flow rates some material may overflow the sides of the trough. The trough 110 is depicted as being linear, but it should be understood that the flow diverting means could include bends and curves. It may also be desirable for the molten stream to flow from one flow diverter to another, thereby additionally extending its residence time in the headspace.

Other variations and modifications as are known to those of skill in the art may be resorted to without departing from the scope of the invention defined by the claims which follow.

We claim:

1. A method of melting and refining glassy material or the like comprising:
producing a melt of the material;
introducing a stream of the molten material to an upper portion of a refiner vessel such that it falls through an open space above a volume of the molten material, in which space a subatmospheric pressure is maintained sufficient to cause at least portions of the stream to foam, whereby a layer of foam gathers on the volume of molten material; and
providing the stream passing through the space with a shape other than a single cylindrical shape along at least a portion of its passage through the open space so as to enhance exposure of the stream to the subatmospheric pressure.

2. The method of claim 1 wherein a plurality of streams pass through at least a portion of the space.

3. The method of claim 2 wherein a single stream enters the space and is subdivided within the space into a plurality of streams.

4. The method of claim 1 wherein a non-cylindrical shape is imparted to the stream as it enters the space by an inlet orifice configuration.

5. The method of claim 1 wherein the stream is reshaped after entering the space by contacting a solid member within the space.

6. The method of claim 5 wherein the solid member subdivides the stream.

7. The method of claim 5 wherein the solid member retards the flow rate of the stream.

8. The method of claim 5 wherein the solid member reduces the thickness of the stream.

9. The method of claim 5 wherein the solid member extends the flow path of the stream through the space.

10. Apparatus for refining molten glass or the like comprising a vessel adapted to hold a volume of molten material being refined with a headspace above the volume of molten material and a foam layer thereon, an inlet opening for admitting a stream of additional molten material to the headspace portion of the vessel positioned to permit material to fall through the space onto the foam layer, means for imposing subatmospheric pressure within the headspace, and stream shaping means associated with the inlet for providing at least a portion of the stream in the headspace with a shape other than a single cylindrical shape.

11. The apparatus of claim 10 wherein the stream shaping means comprises a portion of the inlet opening.

12. The apparatus of claim 10 wherein the stream shaping means is supported within the headspace below the inlet opening.

13. The apparatus of claim 10 wherein the stream shaping means comprises a foraminous member.

14. The apparatus of claim 13 wherein the stream shaping member includes a grid or mesh.

15. The apparatus of claim 13 wherein the stream shaping member is a container having a plurality of orifices.

16. The apparatus of claim 10 wherein the stream shaping member is supported so as to present a surface having a substantial horizontal component in the path of the stream.

17. The apparatus of claim 16 wherein the stream shaping member comprises a horizontally extending trough.

18. The apparatus of claim 10 wherein the stream shaping member includes a plurality of spaces through which molten material may flow from the member.

19. The apparatus of claim 10 wherein the stream shaping member is supported on a horizontally extending arm.

20. The apparatus of claim 10 wherein the stream shaping member is fabricated principally from platinum or platinum alloy.

* * * * *